Aug. 20, 1968 R. W. MOLER 3,397,632

FISH SMOKER

Filed Aug. 5, 1966 2 Sheets-Sheet 1

INVENTOR.
RICHARD W. MOLER

BY *Kimmel, Crowell & Weaver*
ATTORNEYS.

Aug. 20, 1968  R. W. MOLER  3,397,632
FISH SMOKER
Filed Aug. 5, 1966  2 Sheets-Sheet 2
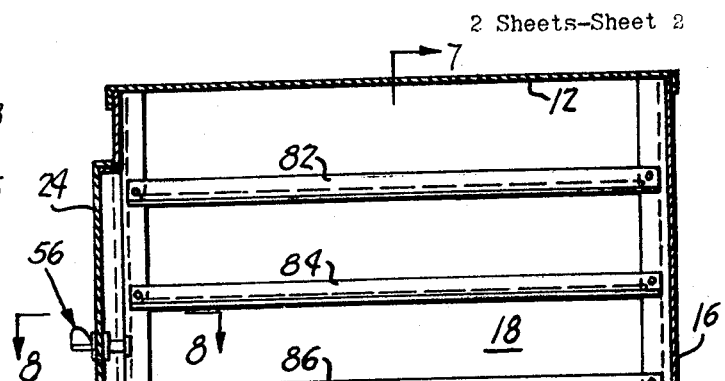
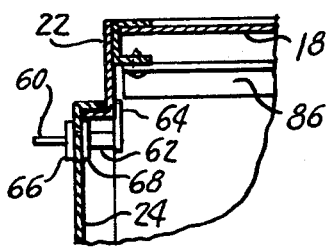
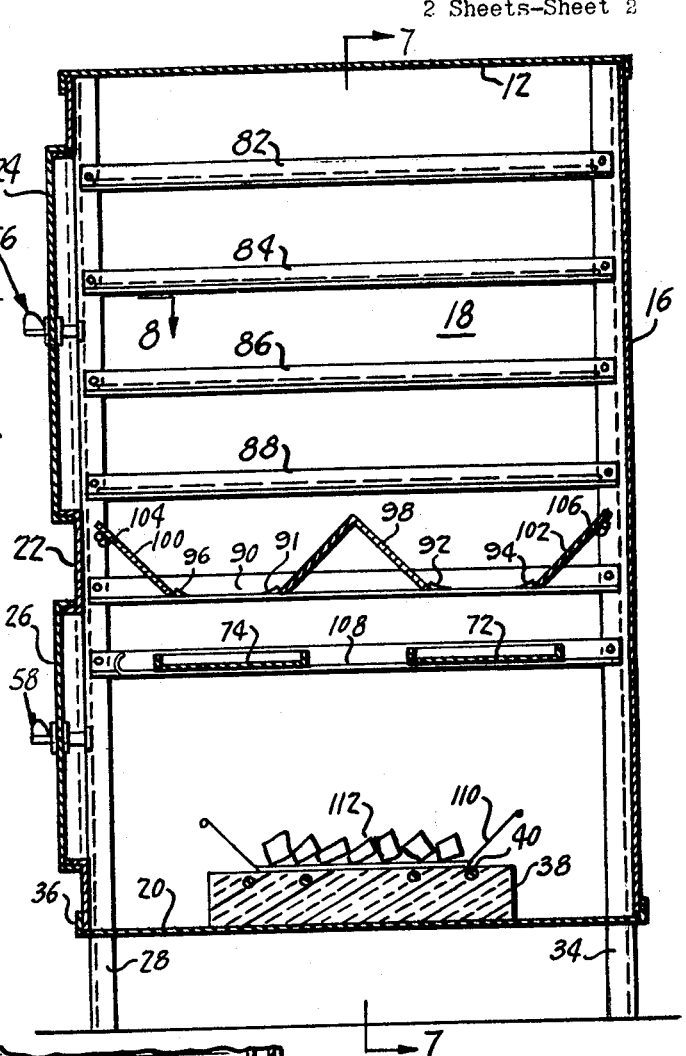
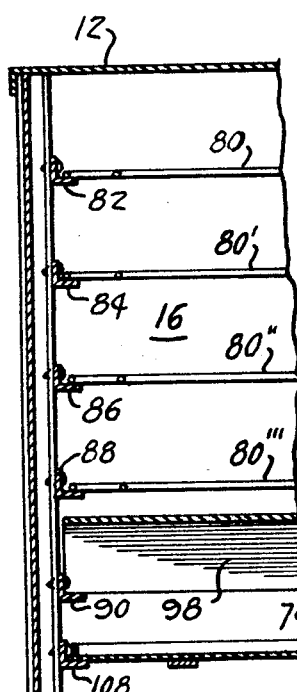
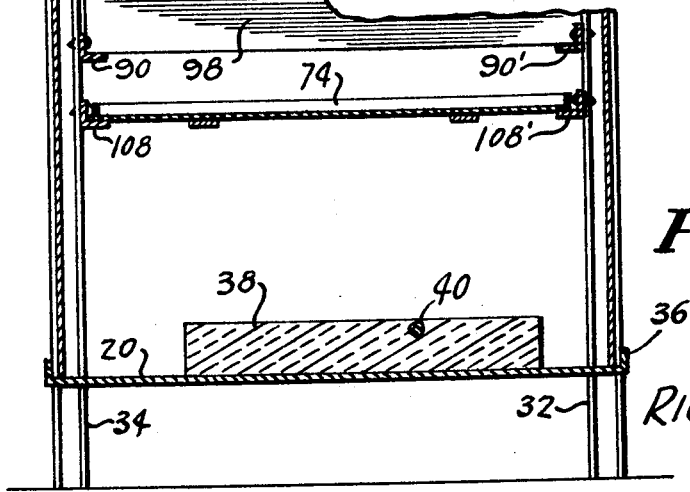
INVENTOR.
RICHARD W. MOLER
BY Kimmel, Crowell & Weaver
ATTORNEYS.

United States Patent Office 3,397,632
Patented Aug. 20, 1968

3,397,632
FISH SMOKER
Richard W. Moler, 713 Hardy Drive,
Broderick, Calif. 95605
Filed Aug. 5, 1966, Ser. No. 570,604
6 Claims. (Cl. 99—259)

ABSTRACT OF THE DISCLOSURE

A fish smoker having drip deflecting vanes mounted beneath fish supporting grids for channeling drippings into pans mounted beneath the vanes. Wood smoke rises around the pans and through openings between the vanes while grease drippings are caught by the pans.

---

This invention relates to an oven for smoking fish and other foods.

Fish smoking ovens are known in the prior art. Such ovens are usually large and expensive to build. Smaller semi-portable ovens are also known. In these ovens it is common to provide heating means and means for pyrolysis of wood, such as hickory, for imparting flavor to the fish during the smoking process.

This invention differs from the smoking ovens of the prior art by the provision of specially designed grease deflectors and catchers, specially designed circulating features for maintaining a more uniform temperature throughout the smoking oven and the provision of control means for maintaining a desired temperature in the oven as well as many important structural details which contribute to the economy and convenience of the fish smoker of this invention.

It is an object of this invention to provide a lightweight fish smoker.

It is also an object of this invention to provide a fish smoker which may be easily assembled from the individual components thereof by the user.

A further and important object of this invention is the provision of a smoker including grease deflecting vanes which direct grease to grease pans and permit free circulation of air within the smoking oven.

A further object of this invention is the provision of means for collecting drippings from the fish or other foods which are to be smoked.

Other objects of this invention will appear from the specification which follows and the drawings to which reference is now made.

In the drawings:

FIGURE 1 is a perspective in partial cut-away showing the overall constructional relationship of the smoking oven of this invention, FIGURE 2 is a top view in cross-section of the smoker of this invention showing the wall and the door construction of this invention taken substantially along line 2—2 in the direction of the arrows of FIGURE 1, FIGURE 3 is similarly a top view in cross-section of the smoker of this invention taken substantially along line 3—3 in the direction of the arrows as shown in FIGURE 1.

FIGURE 6 is a side view in cross-section of the smoker of this invention taken substantially along line 6—6 in the direction of the arrows as shown in FIGURE 1.

FIGURE 7 is a side view of the smoker of this invention at right angles to the plane of FIGURE 6 taken substantially along line 7—7 of FIGURE 6.

FIGURE 8 is a detail of the door and door lock of the invention taken substantially along line 8—8 and shown in cross-section.

Figure 2:
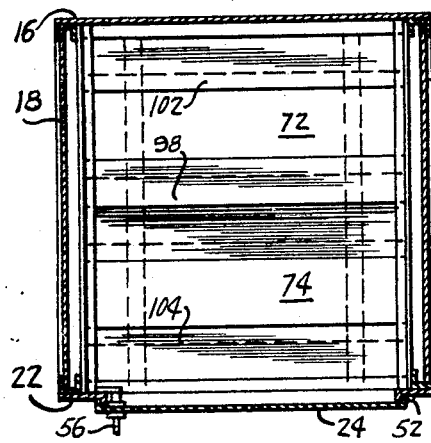

The smoking oven of this invention 10 comprises a top 12, a side 14, back 16, and an opposing side 18. A bottom 20 underlies the oven and a front 22 carrying thereon doors 24 and 26 encloses the front. A plurality of legs 28, 30, 32 and 34, which preferably are in the form of channel iron members, pass through and are detachably secured to the bottom 20 by screws or other means (not shown) and support the oven.

Figure 1:
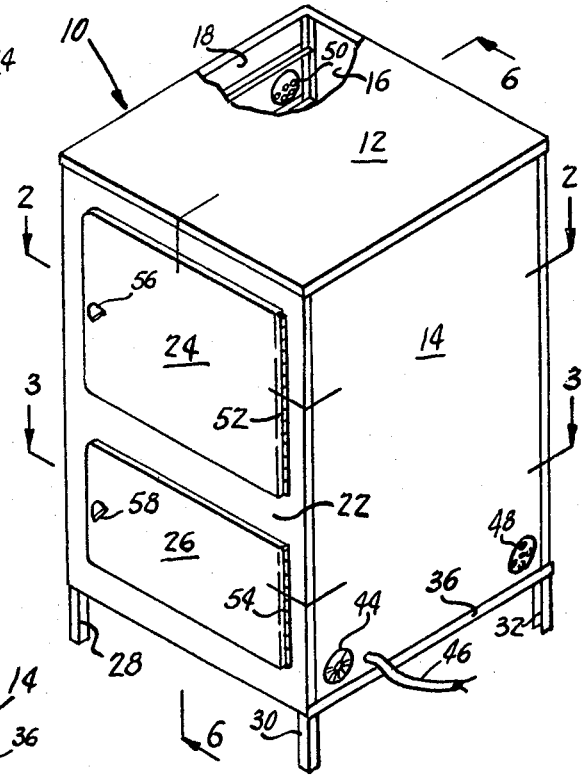
Figure 3:
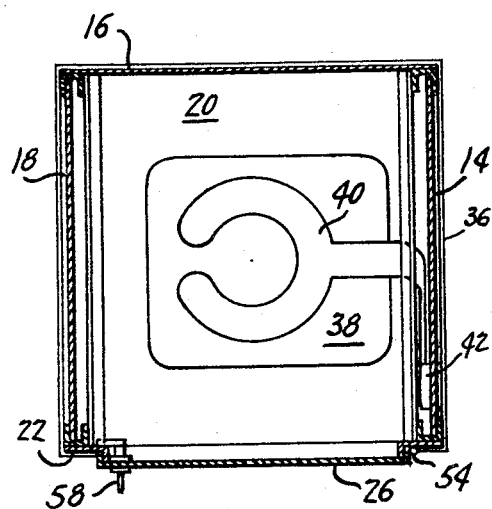

The bottom 20 includes a rim 36 standing upwardly a short distance therefrom which extends around the entire oven and serves to support the sides, front and back. A heater comprising an insulating member 38 and a heater element 40 rests on bottom 20. Leads 42 interconnect the heating element 40 with a thermostat 44, shown in FIGURE 1 on the side 14, and a conductor 46 is provided for connection to a source of electric power. The thermostatic control 44 maintains the temperature of heating element 40, and consequently of the entire oven, at a desired temperature. A vent 48 in the lower portion of side 14 serves as an inlet for cool air and a vent 50 at the upper portion of side 18, as shown in FIGURE 1, serves as an exhaust for warm air. This arrangement has proved uniquely successful in maintaining circulation in the oven and maintaining a desired constant temperature in the oven without undue loss of heat.

Door 24 is secured to front 22 by hinge 52 and door 26 is similarly secured by hinge 54. Latches 56 and 58 are provided for maintaining the doors closed.

With reference to FIGURE 8, the latches may comprise a handle member 60, a shaft 62 extending to the door with a keeper 64 for selectively engaging wall 22. Shaft 62 may be rotatably supported by journal members 66 and 68 in door 24.

Figure 4:
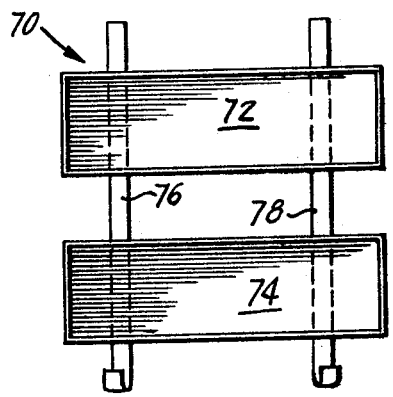
FIGURE 4 is a plan view of the grease catching pans and rack of this invention.
Figure 5:
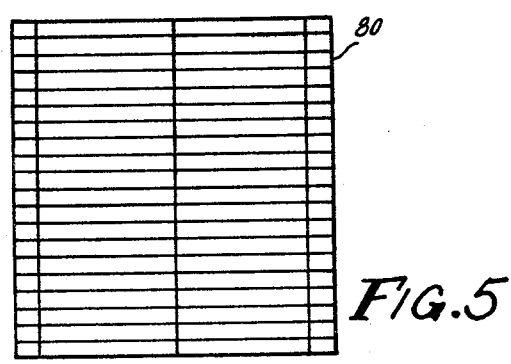
FIGURE 5 shows the fish supporting grill of this invention.

FIGURE 4 shows a catcher for drippings of the fish, meat or other food being smoked. The catcher comprises a pair of pans 72 and 74 supported by a pair of runners 76 and 78 provided with hooks on the front for ease in handling.

A grill 80 is provided for supporting the fish during the smoking process.

With reference now to FIGURES 6 and 7, the oven is supplied interiorly with a plurality of angle iron slide supports 82, 84, 86 and 88, which are secured to the extensions of legs 28 and 34. A plurality of grills 80 are supported thereon and respectively support fish or other food to be smoked. An additional angle iron member 90 is provided with a pair of lugs 91 and 92 spaced approximately in the center thereof and having lugs 94 and 96 proximate the respective ends thereof. An inverted V-shaped dripping deflector 98 is supported on the angle iron 90 between lugs 91 and 92 and vanes 100 and 102 are supported respectively by the lugs 96 and 94 on the angle iron member 90 and by pins 104 and 106 on legs 28 and 34.

Below the drip deflecting vanes 98, 100 ad 102 an additional angle iron support member 108 is provided for supporting the drip collecting member 70 by the ends of pans 72 and 74.

In operation, the fish are placed on the grills 80 in any desired pattern and the grills are placed in the oven on the angle iron support members 82, 84, 86 and 88. A pan 110 holding a plurality of hickory chips 112 is placed on the heating element 40. The thermostat 44 is adjusted to a desired heat to bring about the destructive distillation of the hickory chips and provide the desired temperature and atmosphere for smoking the fish. Of course, other chips than hickory may be used but hickory chips are generally preferred. Circulation to the oven is maintained by adjusting the vents 48 and 50 which are of a conventional type wherein a circular plate having apertures covers a plurality of apertures in the side. Any desired degree of air circulation can thus be provided with the touch of a finger.

It would, of course, be possible to provide enough heat to actually cook the fish during the smoking operation, however, cooking of the fish per se, is not contemplated as the most significant use of the smoking oven. The thermostat is set at the temperature desired to just bring about the destructive distillation and pyrolysis of the hickory chips. Thus the oven is maintained substantially free of combustion products and yet includes the desired flavoring constituents from the pyrolysis of the hickory chips. The actual adjustment will, of course, depend upon the nature of the chips and the humidity, among other factors. Indeed, it may sometimes be desirable to sprinkle the chips with moisture to bring about the desired flavor.

It will be noted that the drippings from the fish do not fall into the heated pan. This is a significant feature of this invention. First, the pyrolysis products of the hickory chips are maintained in the substantially pure form without alteration by combustion of pyrolysis products from the fish drippings. Secondly, cleaning of the oven is greatly facilitated by the provision of the vanes to deflect the grease to catch pans 72 and 74. Door 26 provides access to the heater, the pan and the chips and to the grease drip pans 72 and 74. Access is provided to the grills through door 24. The vanes may be reached from either door. Thus when it is necessary to clean the oven, all of the members of the oven which normally come into contact with the food or any dripping therefrom are easily removable for cleaning.

Another important feature of the invention is the method of construction which permits the oven to be assembled quickly and easily. It will be noted that the top, bottom, sides, front and back and the inner components may be easily constructed of units which may be shipped and stored in the disassembled condition. Aside from the ease of shipping and storage and the consequent savings in space and cost, the oven may also be stored in the home during periods of non-use. To assemble it, all that is necessary is to secure the bottom to the legs, place the sides, back and front in the flange 36 provided on the bottom 20 and place the top 12 over the sides and place the members interior of the oven. Of course, the heater unit may be integral with the side 14 or may be integral with bottom 20. In the latter case, it would be necessary to make the electrical interconnection. Frictional fasteners such as metal screws, bolts may be used to secure the bottom to the legs and to make such other securements as are necessary. These fastenings are not shown for clarity since they are well known to persons skilled in the art.

While the invention has been described with reference to specific structures it will be understood that variations in the materials used for construction, and the specific details of construction may be made without departing from the spirit of the invention. The specific structures shown are merely exemplary of the invention and are not limiting. The scope of the invention is limited by the following claims.

I claim:

1. A fish smoking oven comprising a bottom, sides, a back, a front including thereon an upper and a lower door, legs extending from the four corners of the oven and forming extensions interiorly of the oven for the height thereof, paired support members extending along the sides for supporting a grill, a plurality of grills supported on the support members, a pair of support members for supporting drip deflecting vanes extending along the sides, a pair of vanes sloping downwardly away from the sides of the oven and an inverted V-shaped vane located centrally in the oven parallel to the side vanes for directing the drippings into two longitudinal areas, drip catch pans underlying the vanes in the longitudinal areas for collecting drippings, support members secured to the leg extensions for supporting the drip catch pans, and a heater in the oven bottom for heating the oven and pyrolizing wood to produce a desired smoking atmosphere in the oven.

2. The invention of claim 1 further including a thermostatic control for the heater.

3. The invention of claim 1 wherein the bottom comprises a planar member surrounded by an upwardly extending rim and wherein the sides, back and front are supported on the bottom inside the rim.

4. The invention of claim 1 further including a selectively adjustable vent in the lower portion of a first side and a selectively adjustable vent in the upper portion of a second side.

5. The invention of claim 4 further including a thermostatic control for the heater.

6. The invention of claim 5 wherein the bottom comprises a planar member surrounded by an upwardly extending rim and wherein the sides, back and front are supported on the bottom inside the rim.

References Cited

UNITED STATES PATENTS

| 2,338,156 | 1/1944 | Allen | 99—259 XR |
| 2,722,882 | 11/1955 | Wilson | 99—259 XR |
| 2,763,200 | 9/1956 | Kittler | 99—446 |
| 2,789,877 | 4/1957 | Pfundt | 99—259 XR |
| 2,826,984 | 3/1958 | Krull | 99—446 |
| 2,833,201 | 5/1958 | Simank | 99—259 |
| 2,842,043 | 7/1958 | Revland | 99—259 |
| 2,846,937 | 8/1958 | Jones | 99—259 |
| 3,049,071 | 8/1962 | Diack | 99—446 XR |
| 3,223,022 | 12/1965 | Powell | 99—259 |
| 3,327,616 | 6/1967 | Ozymy | 99—446 XR |

WALTER A. SCHEEL, *Primary Examiner.*

J. M. NEARY, *Assistant Examiner.*